(12) United States Patent
Eckart (10) Patent No.: US 6,850,692 B1
(45) Date of Patent: Feb. 1, 2005

(54) METHOD AND APPARATUS FOR RETRIEVING DIGITAL VIDEO USING SUCCESSIVE LINEAR APPROXIMATION

(75) Inventor: Stefan Eckart, Mountain View, CA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/471,676

(22) Filed: Dec. 23, 1999

(51) Int. Cl.[7] .............................................. H04N 5/783
(52) U.S. Cl. ......................................... 386/69; 386/70
(58) Field of Search .......................... 386/6–8, 69–70, 386/1, 46; 360/72.1, 72.2, 72.3; H04N 5/76, 5/783, 9/79

(56) References Cited

U.S. PATENT DOCUMENTS

| | | | | |
|---|---|---|---|---|
| 5,390,027 A | * | 2/1995 | Henmi et al. ................. | 386/65 |
| 5,488,409 A | * | 1/1996 | Yuen et al. .................... | 725/41 |
| 5,761,371 A | * | 6/1998 | Ohno et al. .................... | 386/46 |
| 5,949,948 A | * | 9/1999 | Krause et al. ................. | 386/6 |
| 6,157,771 A | * | 12/2000 | Brewer et al. ................ | 386/69 |
| 6,356,708 B1 | * | 3/2002 | Krause et al. .............. | 386/109 |

* cited by examiner

*Primary Examiner*—Thai Tran
(74) *Attorney, Agent, or Firm*—Vedder, Price, Kaufman & Kammholz, P.C.

(57) ABSTRACT

A method and apparatus for successive linear approximation to obtain a specific point on a non-linear monotonic function include processing that begins by obtaining a T-coordinate for the specific point. The specific point includes a T-coordinate and an N-coordinate. The process then continues by selecting a minimum point and a maximum point on the non-linear monotonic function to bound the specific point. The processing then continues by deriving a linear reference between the minimum and maximum points. The process then proceeds by obtaining a reference N-coordinate that lies on the linear reference based on the T-coordinate. The process then continues by determining a reference T-coordinate lying on the non-linear monotonic function based on the referenced N-coordinate. The process then continues by determining whether the referenced T-coordinate is substantially similar to the T-coordinate. When the referenced T-coordinate is not substantially similar to the T-coordinate, re-defining the minimum point or the maximum point based on the referenced T-coordinate. The process then repeats until the referenced T-coordinate is substantially similar to the T-coordinate. Once the referenced T-coordinate is substantially similar to the T-coordinate, the referenced N-coordinate is determined to be substantially equal to the N-coordinate such that the specific point.

20 Claims, 7 Drawing Sheets

METHOD AND APPARATUS FOR RETRIEVING DIGITAL VIDEO USING SUCCESSIVE LINEAR APPROXIMATION

TECHNICAL FIELD OF THE INVENTION

This invention relates generally to video processing and more particularly to determining video start times in stored video data.

BACKGROUND OF THE INVENTION

With the advent of digital video technology, many new and exciting products are available. One such product is a digital videocassette recorders (VCR), which receives an analog television broadcast, converts it into an MPEG ("Motion Picture Expert Group") digital format and stores the MPEG video. By storing the television broadcast signals in a digital format, the user may view the recorded digital images in a variety of ways, including fast forward, rewind, pause, etc.

The digital VCR allows a user to store various programs and to amass a substantial amount of video data. Such video data may span several hours of program viewing. When the user desires to watch a particular program or particular section of a program, the user inputs the particular start time that corresponds with the beginning of a program or the desired section. For example, if the user has stored programs that are broadcast via a network channel that begin at 7:00 p.m. and end at 10:00 p.m. and desires to watch the program that began at 8:30, the user would enter 8:30 p.m. as the start time.

As is known, MPEG video images are time-stamped, for example every 2 kilobytes of data. As such, when the user enters a particular start time, the time-stamps are used to identify the start of the corresponding data. An issue arises with MPEG video data in that the amount of data stored over time is not linear, i.e., it is a non-linear monotonic function. As is known, when an action scene is being recorded, substantially more digital information is used to represent those images than relatively stationary images. Thus, over time the storage of MPEG video data is a non-linear.

As with any commercial product speed in responding to user input commands are important. If the digital VCR determines the starting point of a program by scanning the time stamps and seeking a match, a significant amount of processing resources and time may be consumed. Such processing may be noticeable to the user in a detrimental way. Thus, it is important for commercially viable digital VCRs to incorporate a technique that efficiently seeks the start of MPEG video data that is to be subsequently viewed.

Therefore, a need exists for a method and apparatus for successive linear approximation to obtain a specific point of a non-linear monotonic function such that fast seeking of MPEG video can be realized.

DETAILED DESCRIPTION OF A PREFERRED EMBODIMENT

Generally, the present invention provides a method and apparatus for successive linear approximation to obtain a specific point on a non-linear monotonic function. The specific point includes a T-coordinate and an N-coordinate. The method and apparatus include processing that begins by obtaining a T-coordinate for the specific point. The process then continues by selecting a minimum point and a maximum point on the non-linear monotonic function to bound the specific point. The processing then continues by deriving a linear reference between the minimum and maximum points. The process then proceeds by obtaining a reference N-coordinate that lies on the linear reference based on the T-coordinate. The process then continues by determining a reference T-coordinate lying on the non-linear monotonic function based on the reference N-coordinate. The process then continues by determining whether the reference T-coordinate is substantially similar to the T-coordinate. When the reference T-coordinate is not substantially similar to the T-coordinate, the process re-defines the minimum point or the maximum point based on the referenced T-coordinate. The process then repeats until the reference T-coordinate is substantially similar to the T-coordinate. Once the referenced T-coordinate is substantially similar to the T-coordinate, the referenced N-coordinate is determined to be substantially equal to the N-coordinate such that the specific point, i.e., the N and T coordinates are defined. With such a method and apparatus, rapid determination of a specific point on a non-linear monotonic function may be obtained. Such processing is readily usable in digital VCRs to determine the starting point of a user selected program.

Figure 1:
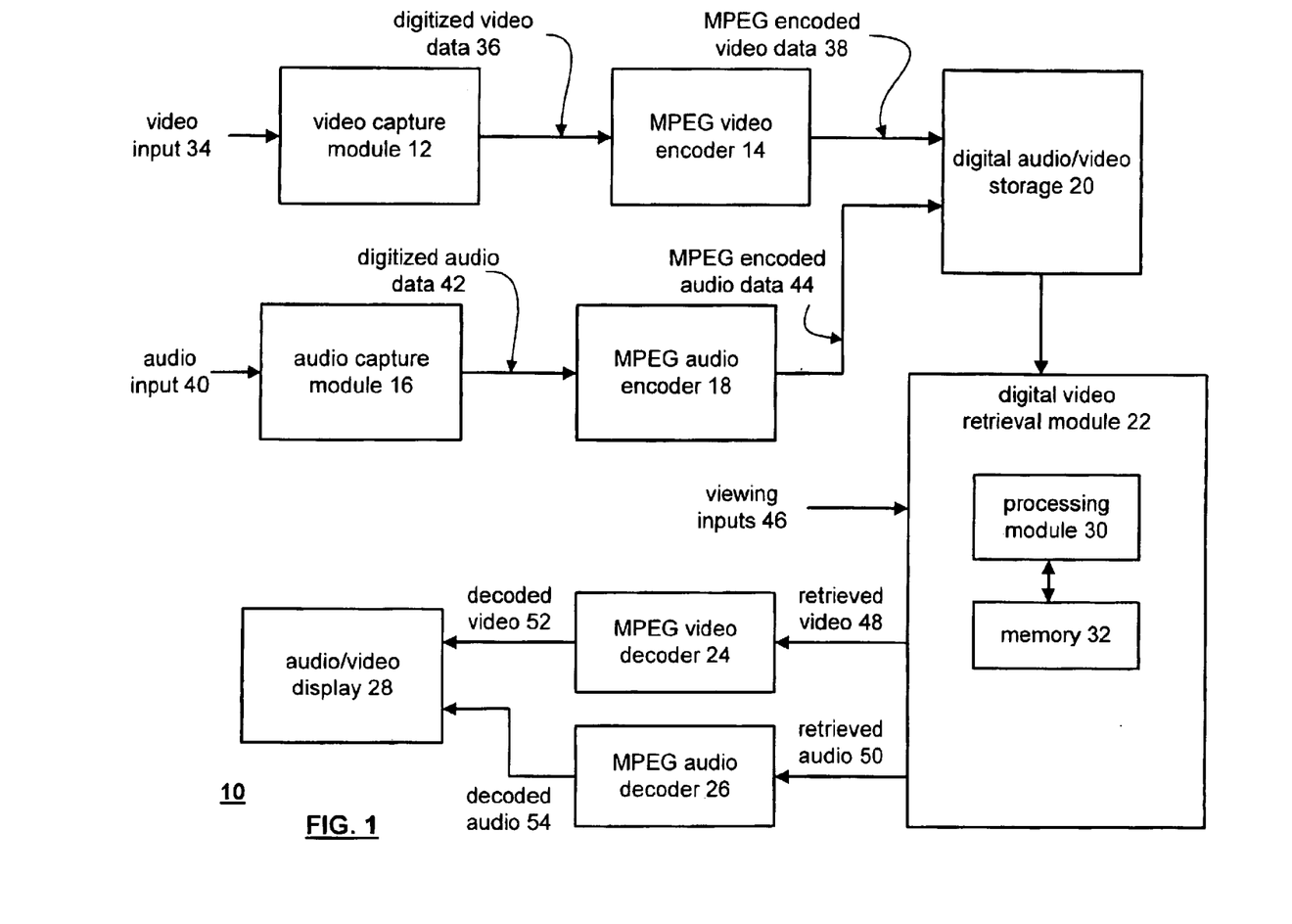
FIG. 1 illustrates a schematic block diagram of a digital video recorder in accordance with the present invention.

The present invention can be more fully described with reference to FIGS. 1 through 8. FIG. 1 illustrates a schematic block diagram of a digital VCR 10 that includes a video capture module 12, an MPEG video encoder 14, an audio capture module 16, an MPEG audio encoder 18, a digital audio/video storage element 20, a digital video retrieval module 22, an MPEG video decoder 24, an MPEG audio decoder 26, and an audio/video display 28. Note that the audio/video display 28 is not required to be part of the digital VCR and may be a separate element. In operation, the video capture module 12 receives video inputs 34 and processes them to produce digitized video data 36. The processing of video inputs from NTSC broadcasts, VCR outputs, etc. and converting them into digitized video data 36 is known. Such a conversion is utilized in the All-in-Wonder product produced and manufactured by ATI Technologies.

The MPEG video encoder 14 receives the digitized video data 36 and encodes it into MPEG encoded video data 38. Such a video encoding process is known. In addition to processing video data, audio data is processed. An audio input 40 is received by the audio capture module 16, which produces digitized audio data 42 therefrom. The MPEG audio encoder 18 converts the digitized audio data 42 into an MPEG encoded audio data 44.

The digital audio/video storage 20 stores the MPEG encoded video data 38 and the MPEG encoded audio data 44. The data is subsequently retrieved based on viewing inputs 46 received by the digital video retrieval module 22.

The digital video retrieval module 22 includes a processing module 30 and memory 32. The processing module 30 may be a single processing device or a plurality of processing devices. Such a processing device may be a microcontroller, microcomputer, DSP, central processing unit, state machine, logic circuitry, and/or any device that processes signals (analog and/or digital) based on operational instructions. The memory may be a single memory device or a plurality of memory devices. Such a memory device may be random access memory, read-only memory, system memory, and/or any device that stores digital information. Note that the processing module may also be a central processing unit and the memory may be system memory of a personal computer. Further note that when the processing module implements one or more of its functions utilizing a state machine and/or logic circuitry, the memory storing the corresponding operational instructions is embedded within the circuitry comprising the state machine and/or logic circuit.

The digital video retrieval module 22 receives the viewing inputs 46 and processes them to determine the corresponding audio and video data to be retrieved from the storage 20. The viewing inputs 46 may be the selection of a particular program that starts at a particular time. Having determined the starting point, the retrieval module 22 uses a successive linear approximation scheme to obtain the starting byte of the desired program. The successive linear approximation scheme determines a specific point on a non-linear monotonic function (i.e., bytes of MPEG data stored over time), which will be described in greater detail with reference to the remaining figures. The digital video retrieval module 22 provides retrieved video 48 and retrieved audio 50 to the MPEG video decoder 24 and the MPEG audio decoder 26. The decoders 24 and 26 respectively produce decoded video 52 and decoded audio 54. The decoded video 52 and audio 54 are provided to an audio/video display 28 for viewing by the user.

Figure 2:
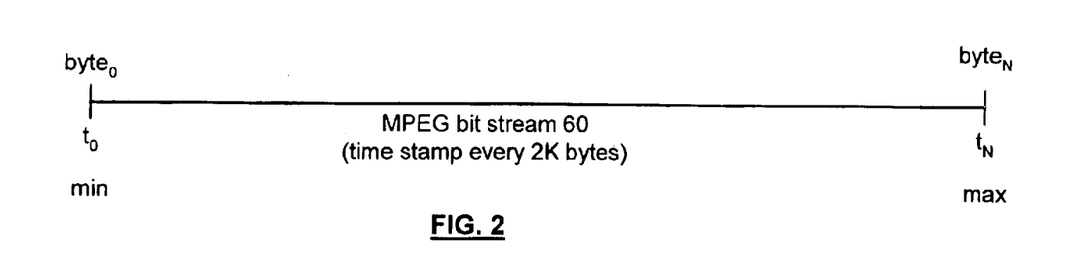
FIG. 2 illustrates a graphical representation of MPEG video being stored in accordance with the present invention.

FIG. 2 illustrates a simple graphic diagram of an MPEG bit steam 60 that is stored over time. The MPEG big stream is time stamped, for example, every 2 kilobytes of data, The MPEG bit stream 60 will vary in length depending on the size of the storage [20]. As shown, byte 0 corresponds to time to, which is the first piece of video information stored and spans over time to encompass N bytes of video data, wherein byte $_N$ occurs at time $t_N$. For Example, if the storage [20] has a capability of storing 8 gigabytes of data, time $t_0$ will correspond to the first byte of video data stored in the memory and the time $t_N$ will correspond to the last byte of the 8 gigabytes of video data.

Figure 3:
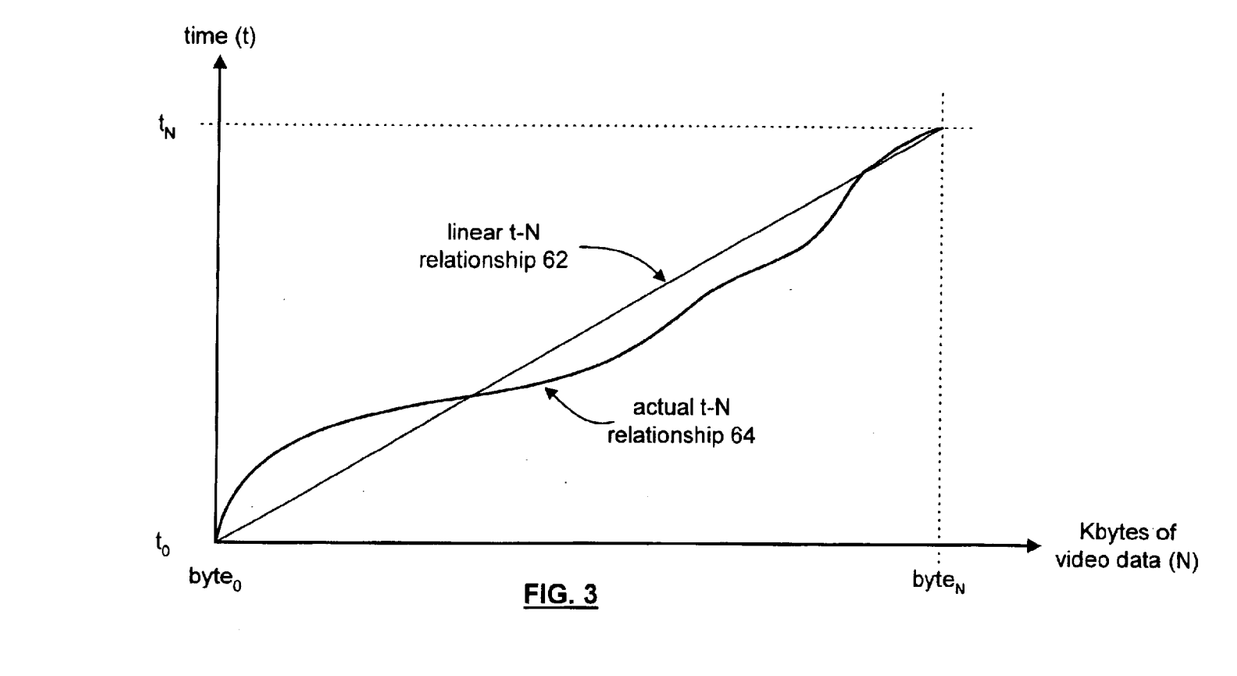
FIG. 3 illustrates a graphical representation of a non-linear monotonic function that may result from storing MPEG video data in accordance with the present invention.

FIG. 3 illustrates in graphic form an actual relationship of kilobytes of MPEG video data being stored over time. In this illustration, a linear relationship 62 of time versus kilobytes of video data is shown in comparison with the actual relationship 64. In this illustration when the slope of the actual relationship 64 is less than the slope of the linear relationship 62, the images being stored typically correspond to an action scene. As is known, in action scenes, the amount of MPEG video information to represent the corresponding images is larger than still images. When the slope of the actual relationship 64 is greater than the slope of the linear relationship 62, the images being stored correspond to relatively still images where the amount of MPEG information required is relatively small.

Figure 4:
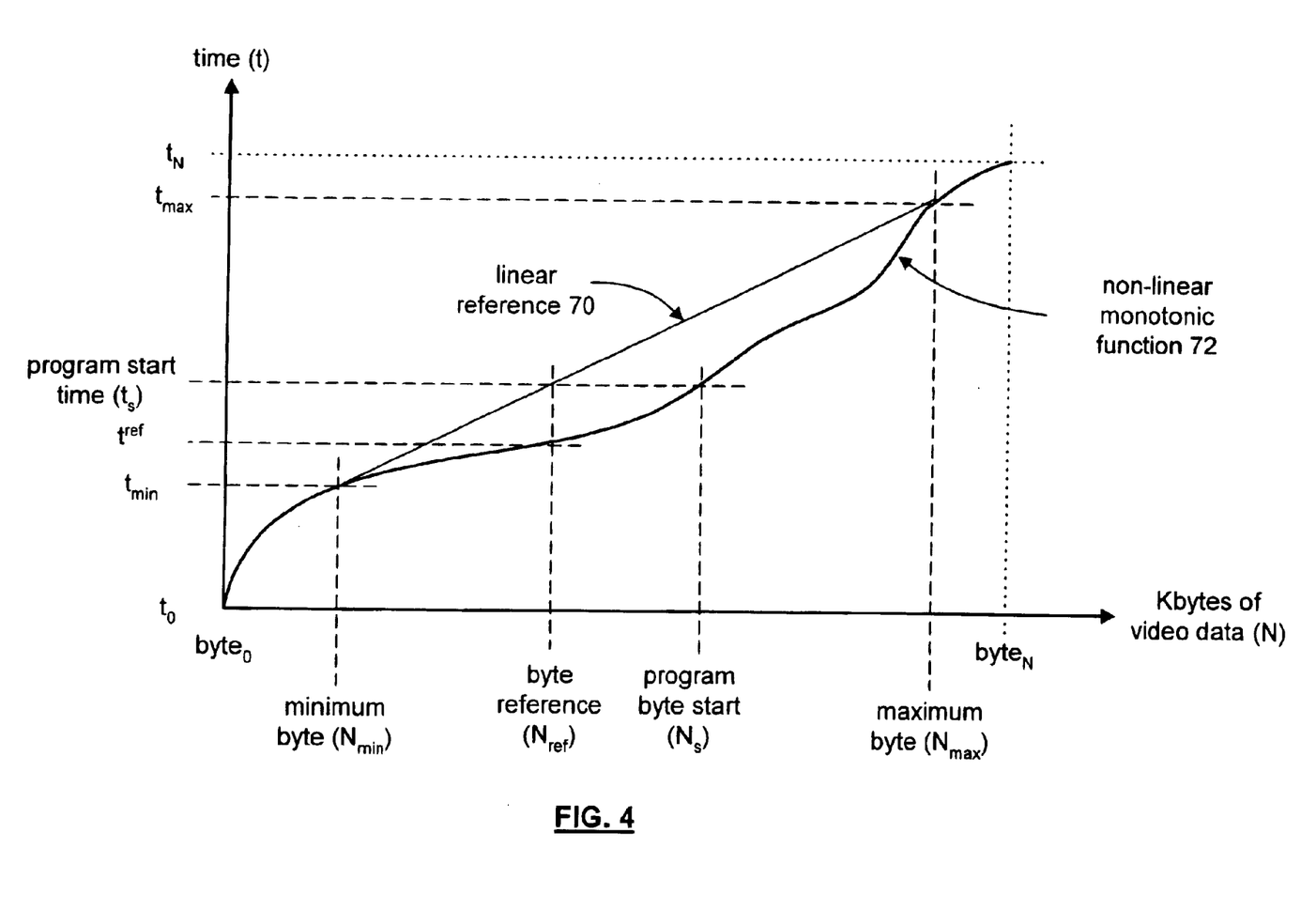
FIGS. 4 through 6 illustrate a graphical representation of successive linear approximation in accordance with the present invention.
Figure 5:
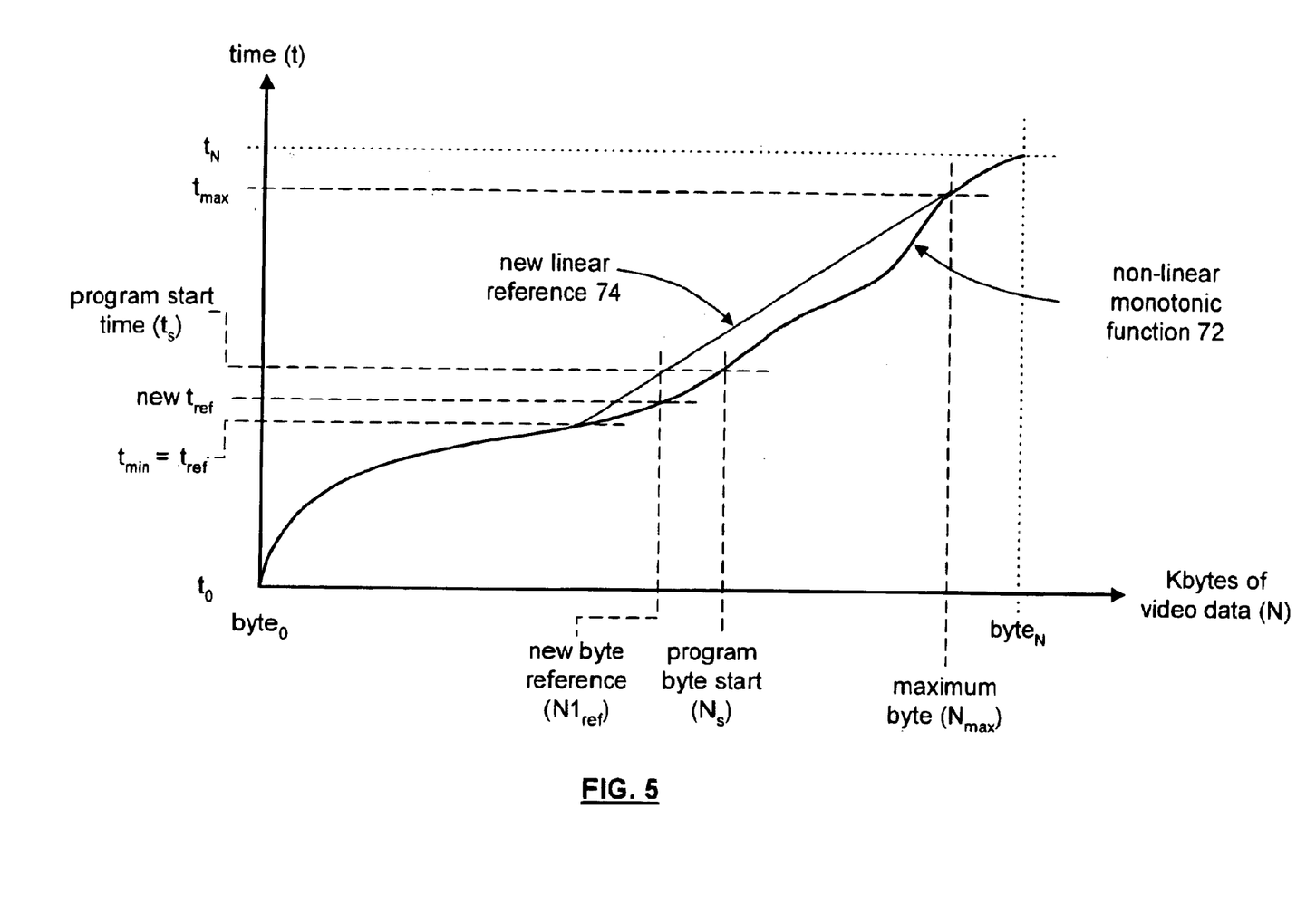
Figure 6:
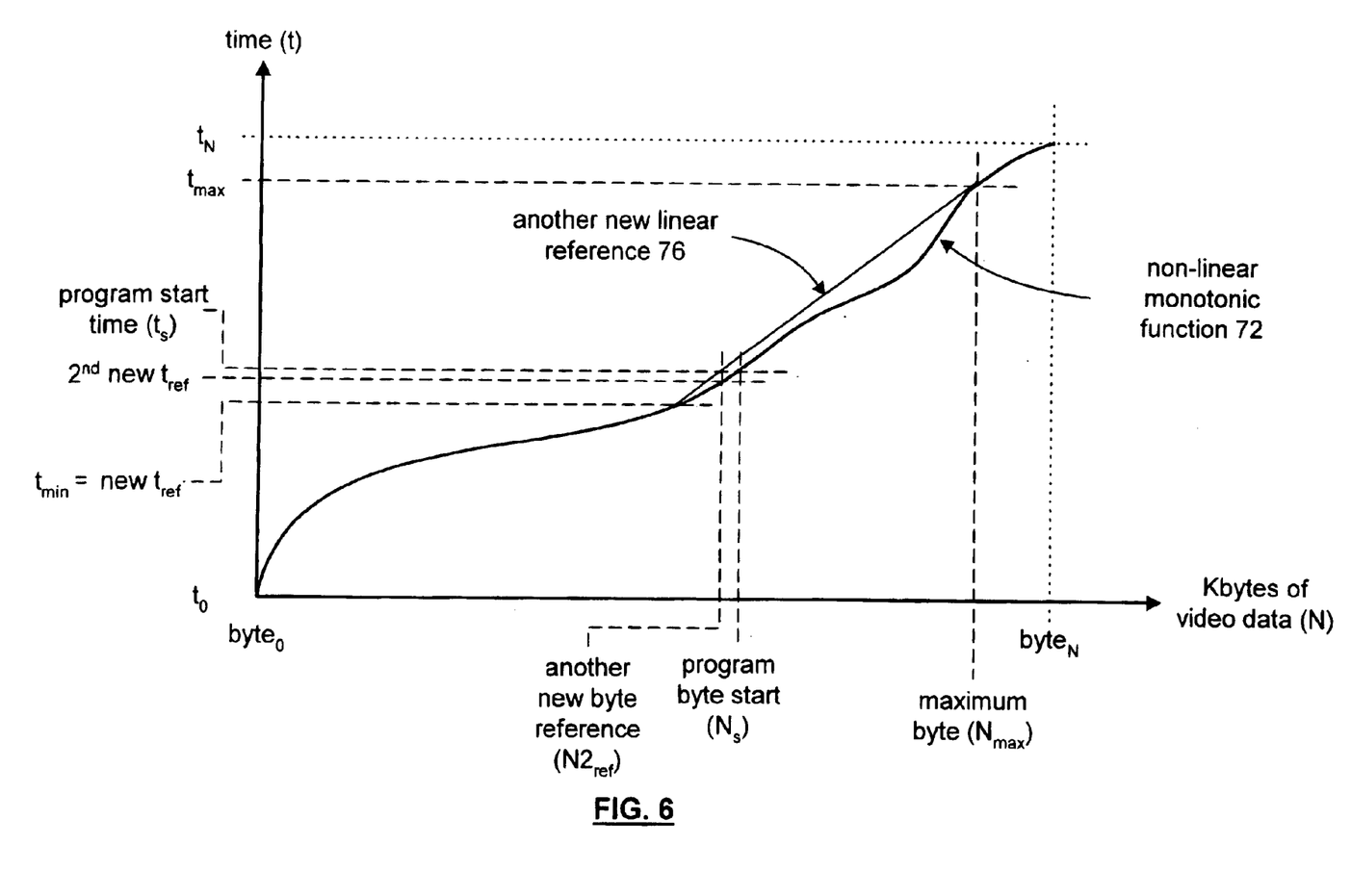

FIGS. 4 through 6 illustrate a graphical representation of the successive linear approximation to obtain a specific point on a non-linear monotonic function. In this illustration, the non-linear monotonic function 72 may represent the video data in an MPEG encoded stream. The unit for the horizontal axis relates to kilobytes of video data and the units for the vertical axis correspond to time. At time $t_0$, byte 0 is recorded and spans to byte$_N$ at time $t_N$, which is the maximum amount of data that may be stored. In this particular example, the user has inputted a particular start time that is designated by $t_s$. Having obtained the start time $t_s$, a minimum point and a maximum point are determined to bound the start time $t_s$ and its corresponding program byte start ($N_s$). The minimum and maximum boundary points may be selected to be the time 0, byte 0 and time $t_n$ and byte$_N$. Alternatively, a preliminary calculation may be determined to identify that the start time is going to be bounded with less than the absolute minimum and maximum values. In the example shown, the minimum point is referenced by $t_{min}$ and $N_{min}$. The maximum point is referenced by $t_{max}$ and $N_{max}$.

Having obtained the minimum and maximum points, a linear reference 70 is drawn between them. Once the linear reference is obtained, the point lying on the linear reference 70 corresponding to the start time $t_s$ is used to determine a byte reference $N_{ref}$. Having obtained the byte reference $N_{ref}$, a reference time $t_{ref}$ is determined based on the intersection of $N_{ref}$ with the non-linear monotonic function 72.

Having obtained the byte reference $N_{ref}$ and $t_{ref}$, the processing proceeds, as shown in FIG. 5, to make a first determination as to whether the referenced point $N_{ref}$ lies between the actual reference point and the min or max values. In this example, the reference point $N_{ref}$ lies between the actual point and the minimum point. FIG. 5 illustrates the next processing wherein $t_{min}$ is reset to $t_{ref}$ as determined in FIG. 4. The $t_{ref}$ is now set to $t_{min}$ and used as the minimum where $t_{ref}$ and $N_{ref}$ are used as the new minimum reference point. Having obtained the new minimum reference point, a new linear reference 74 is drawn between the new minimum reference point and the maximum reference point. A new byte reference $N1_{ref}$ is then determined based on the intersection of the new linear reference 74 with the program start time $t_s$. Having obtained this, a new $t_{ref}$ is obtained by the intersection of the new byte reference $N1_{ref}$ with the non-linear monotonic function. Having obtained this information, the processing continues as illustrated in FIG. 6.

In FIG. 6, the new reference point is defined based on the new $t_{ref}$ being equal to $t_{min}$. Another new linear reference 76 is drawn between another new minimum reference and the maximum reference point. Having done this, another new byte reference $N2_{ref}$ is determined based on the intersection of the another new linear reference 76 and the program start time $t_s$. Having determined this, the second new $t_{ref}$ is obtained based on the intersection of the new byte reference $N2_{ref}$ and the non-linear monotonic function. Having obtained the second new $t_{ref}$, a determination is made as to whether it is substantially similar to $t_s$. The values will be similar when they have the same time stamp, or within a few time stamps, such that the program start byte is within 2 kilobytes of the appropriate start time. If the new $t_{ref}$ is not substantially equal to the program state time, the processing as shown in FIGS. 4–6 is continued until it is.

Figure 7:
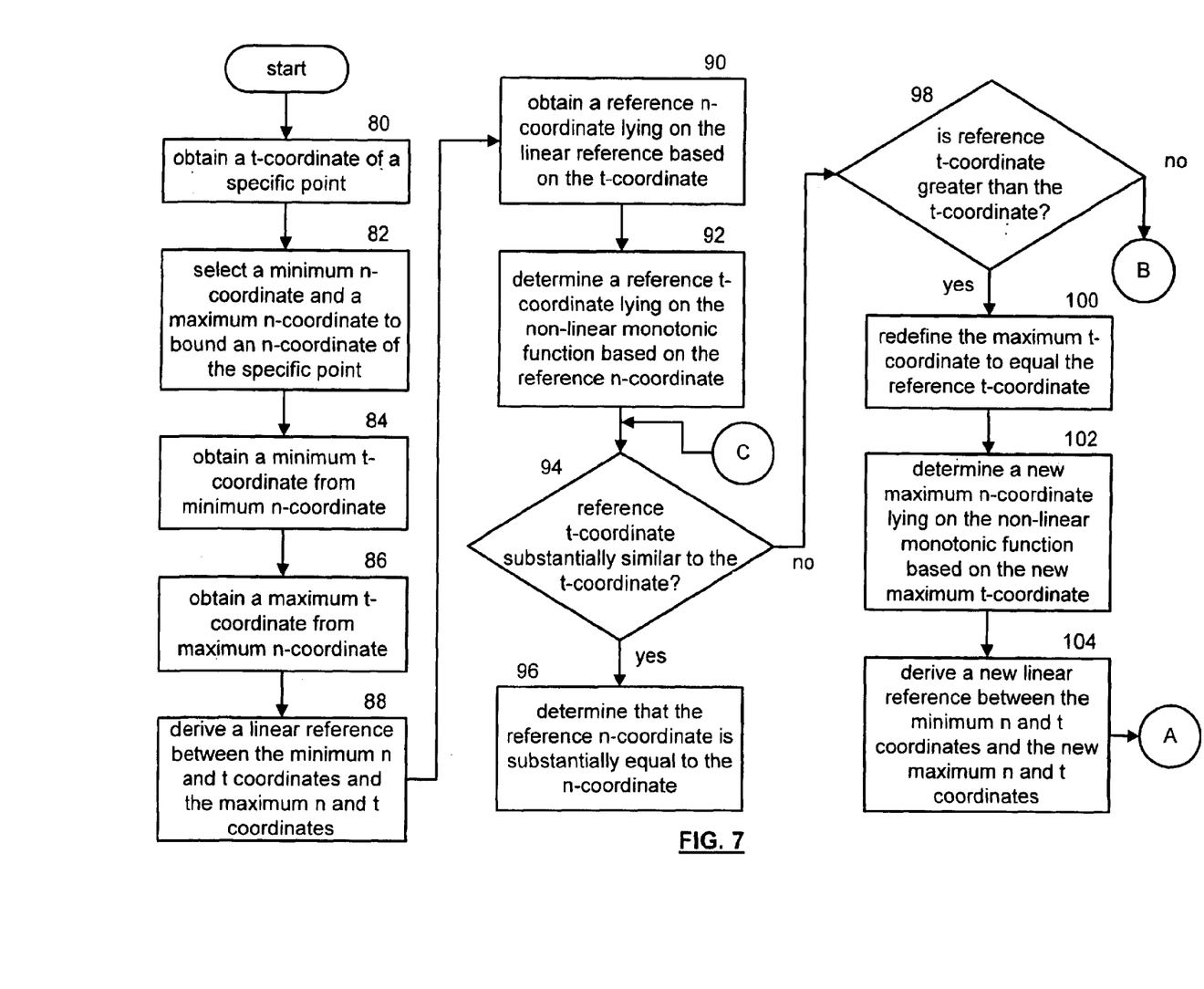
FIGS. 7 and 8 illustrate a logic diagram of a method for successive linear approximation to obtain a specific point of a non-linear monotonic function in accordance with the present invention.
Figure 8:
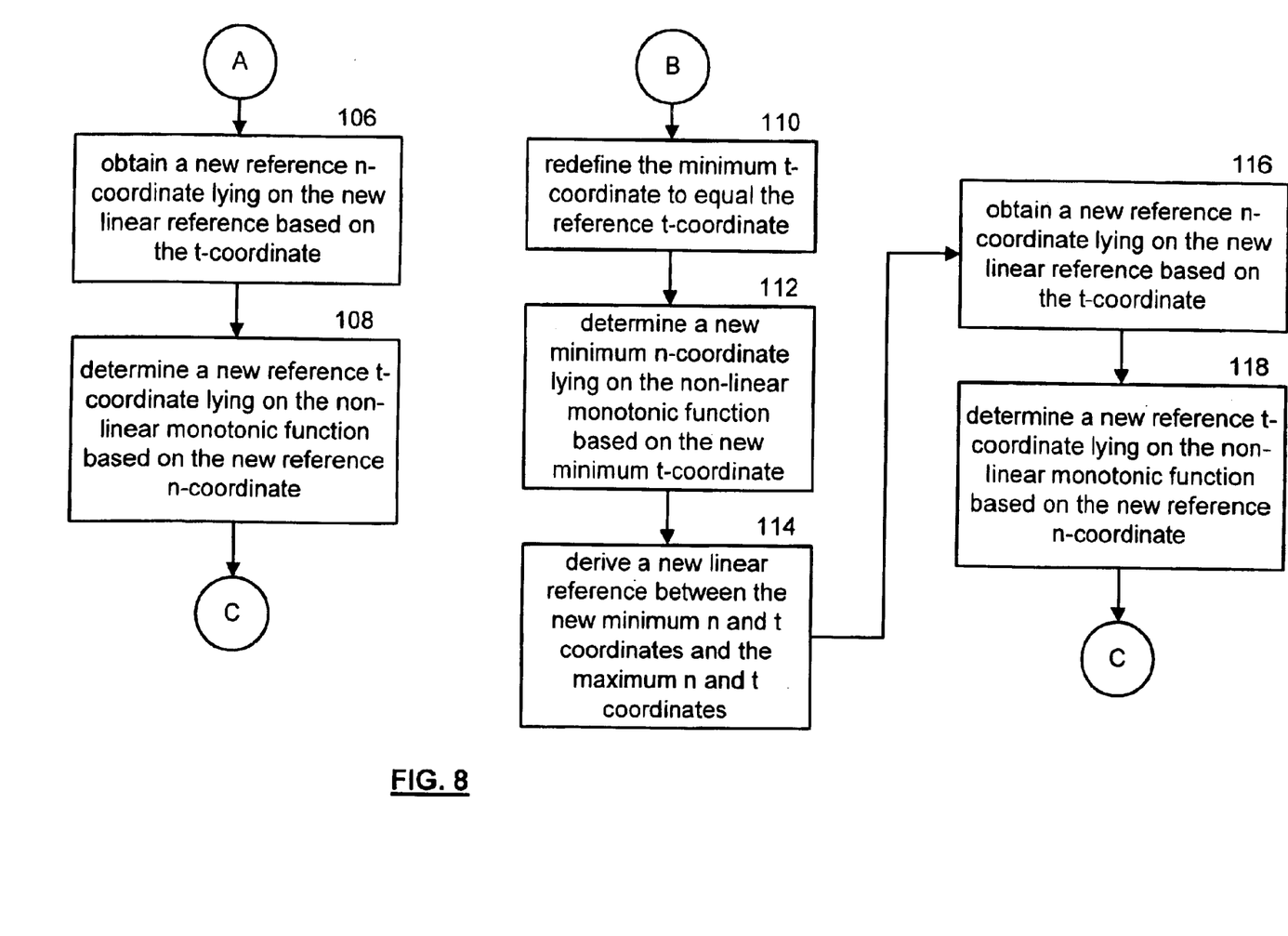

FIGS. 7 and 8 illustrate a logic diagram of a method for successive linear approximation to obtain a specific point of a non-linear monotonic function. The processing steps of FIGS. 7 and 8 may be stored in memory 32 and executed by processing module 30 of the digital video retrieval module 22. The process begins at step 80 where a t-coordinate of a specific point is obtained. The t-coordinate may comprise a time stamp value that is associated with a beginning of a video program stored in a video file. The specific point would also include an n- coordinate, which would comprise a byte count value associated with the beginning of the video program. Such a video program, or video file, may be stored as MPEG video data and MPEG audio data.

The process then proceeds to step 82 where a minimum n-coordinate and a maximum n-coordinate are selected to bound the n-coordinate of the specific point. The process then proceeds to step 84 where a minimum t-coordinate is obtained from the minimum n-coordinate based on the intersection of the minimum n-coordinate and the non-linear monotonic function. The process then proceeds to step 86 where a maximum t-coordinate is obtained from the intersection of the maximum n-coordinate with the non-linear monotonic function.

The process then proceeds to step 88 where a linear reference is derived between the minimum n- and t-coordinates and the maximum n- and t-coordinates. The step then proceeds to step 90 where a reference n-coordinate is obtained based on the intersection of the t-coordinate and the linear reference. The process then proceeds to step 92 where a reference t-coordinate that lies on the non-linear monotonic functions is determined based on the intersection of the reference n-coordinate and the non-linear monotonic function. The process then proceeds to step 94 where a determination is made as to the reference t-coordinate is substantially similar to the t-coordinate. If so, the process proceeds to step 96 where the reference n-coordinate is determined to be substantially equal to the n-coordinate. Having done this, the specific point on the non-linear monotonic function is determined.

If, however, the referenced t-coordinate is not substantially similar to the t-coordinate, the process proceeds to step 98. At step 98 a determination is made as to whether the reference t-coordinate is greater than the t-coordinate. If so, the process proceeds to step 100 where the maximum t-coordinate is redefined to equal the reference t-coordinate. The process then proceeds to step 102 where a new maximum n-coordinate that lies on the non-linear monotonic function is determined based on the new maximum t-coordinate intersecting with the non-linear monotonic function. The process then proceeds to step 104 where a new maximum t-coordinate intersecting with the non-linear monotonic function. The process then proceeds to step 104 where a new linear reference is derived between the minimum n- and t-coordinates and the new maximum n-and t-coordinates. The process then continues at step 106 of FIG. 8 where a new reference n-coordinate that lies on the new linear reference is obtained based on the t-coordinate intersecting the new linear reference. The process then proceeds to step 108 where a new reference t-coordinate that lies on the non-linear monotonic function is determined based on the intersection of the new reference n-coordinate and the non-linear monotonic function. Having done this the process reverts to step 94 of FIG. 7.

If at step 98 it was determined that the reference t-coordinate is not greater than the t-coordinate the process proceeds to step 110 of FIG. 8. At step 110 the minimum t-coordinate is redefined to equal the referenced t-coordinate. The process then proceeds to step 112 where a new minimum n-coordinate that lies on the non-linear monotonic function is determined based on the intersection of the new minimum t-coordinate and the non-linear monotonic function. The process then proceeds to step 114 where a new linear reference is derived between the new minimum n- and t-coordinates and the maximum n- and t-coordinates. The process then proceeds to step 116 where a new reference n-coordinate that lies on the new linear reference is obtained based on the intersection of the t-coordinate and the new linear reference. The process then proceeds to step 118 where a new reference t-coordinate that lies on the non-linear monotonic function is determined based on the intersection of the new referenced n-coordinate and the non-linear monotonic function.

The preceding discussion has presented a method and apparatus for a successive linear approximation to obtain a specific point of a non-linear monotonic function. Such a method and apparatus will be useful in a digital VCR to determine a starting point in a selected program for viewing. As one of average skill in the art will appreciate other embodiments may be derived from the teachings of the present invention without deviating the scope of the claims.

What is claimed is:

1. A method for retrieving digital video stored in memory comprising:
   (a) obtaining a specific start time of at least a portion of digital video represented as a t-coordinate;
   (b) selecting a minimum n-coordinate and a maximum n-coordinate to bound a specific start location of the digital video represented as a n-coordinate;
   (c) obtaining a minimum t-coordinate based on the minimum n-coordinate;
   (d) obtaining a maximum t-coordinate based on the maximum n-coordinate;
   (e) deriving a linear reference between the minimum n and t coordinates and the maximum n and t coordinates;
   (f) obtaining a reference n-coordinate lying on the linear reference based on the t-coordinate;
   (g) determining a reference t-coordinate lying on a non-linear monotonic, function, representing digital video stored over time, based on the reference n-coordinate;
   (h) determining whether the reference t-coordinate is substantially similar to the t-coordinate;
   (i) when the reference t-coordinate is substantially similar to the t-coordinate, determining that the reference n-coordinate is substantially equal to the n-coordinate, wherein the t-coordinate and the n-coordinate define a starting point of digital video; and
   (j) retrieving from memory the digital video based on the starting point.

2. The method of claim 1 further comprises, when the reference t-coordinate is not substantially similar to the t-coordinate,
   (a) determining whether the reference t-coordinate is greater than the t-coordinate;
   (b) when the reference t-coordinate is greater than the t-coordinate, redefining the maximum t-coordinate to equal the reference t-coordinate to produce a first maximum t-coordinate;
   (c) determining a first maximum n-coordinate lying on the non-linear monotonic function based on the first maximum t-coordinate;
   (d) deriving a first linear reference between the minimum n and t coordinates and the first maximum n and t coordinates;
   (e) obtaining a first reference n-coordinate lying on the first linear reference based on the t-coordinate;
   (f) determining a first reference t-coordinate lying on the non-linear monotonic function based on the first reference n-coordinate;
   (g) determining whether the first reference t-coordinate is substantially similar to the t-coordinate; and
   (h) when the first reference t-coordinate is substantially similar to the t-coordinate, determining that the first reference n-coordinate is substantially equal to the n-coordinate.

3. The method of claim 1 further comprises, when the reference t-coordinate is not substantially similar to the t-coordinate;
   (a) determining whether the reference t-coordinate is less than the t-coordinate;
   (b) when the reference t-coordinate is less than the t-coordinate, redefining the minimum t-coordinate to equal the reference t-coordinate to produce a first minimum t-coordinate;
   (c) deriving a first linear reference between the first minimum n and t coordinates and the maximum n and t coordinates;
   (d) obtaining a first reference n-coordinate lying on the first linear reference based on the t-coordinate;
   (e) determining a first reference t-coordinate lying on the non-linear monotonic function based on the first reference n-coordinate;
   (f) determining whether the first reference t-coordinate is substantially similar to the t-coordinate; and
   (g) when the first reference t-coordinate is substantially similar to the t-coordinate, determining that the first reference n-coordinate is substantially equal to the n-coordinate.

4. The method of claim 1, wherein the t-coordinate comprises a time stamp value associated with a beginning of a video program stored in a video file and wherein the n-coordinate comprises a byte count value associated with the beginning of the video program.

5. The method of claim 4, wherein the video file comprises MPEG video data and MPEG audio data.

6. A method for retrieving digital video stored in memory comprising:
   (a) obtaining a specific start time of digital video represented as a t-coordinate;
   (b) selecting a minimum point and a maximum point that bound the starting point, wherein the minimum point and the maximum point lie on a non-linear monotonic function, representing digital video stored over time;
   (c) deriving a linear reference between the minimum and the maximum points;
   (d) obtaining a reference n-coordinate lying on the linear reference based on the t-coordinate;
   (e) determining a reference t-coordinate lying on the non-linear monotonic function based on the reference n-coordinate;
   (f) determining whether the reference t-coordinate is substantially similar to the t-coordinate;
   (g) when the reference t-coordinate is not substantially similar to the t-coordinate, redefining the minimum point or the maximum point based on the reference t-coordinate;
   (h) repeating steps (b) through (g) until the reference t-coordinate is substantially similar to the t-coordinate;
   (i) when the reference t-coordinate is substantially similar to the t-coordinate, determining that the reference n-coordinate is substantially equal to a specific start location of digital video represented as the n-coordinate, wherein the t-coordinate and the n-coordinate define the starting point; and
   j) retrieving from memory the digital video based on the starting point.

7. The method of claim 6, wherein step (g) comprises, when the reference t-coordinate is not substantially similar to the t-coordinate, (a) redefining the minimum point to correspond to the reference t-coordinate and the reference n-coordinate, when the reference t-coordinate is less than the t-coordinate.

8. The method of claim 6, wherein step (g) further comprises, when the reference t-coordinate is not substantially similar to the t-coordinate,
   (a) redefining the maximum point to correspond to the reference t-coordinate and the reference n-coordinate, when the reference t-coordinate is greater than the t-coordinate.

9. The method of claim 6, wherein the t-coordinate comprises a time stamp value associated with a beginning of a video program stored in a video file and wherein the n-coordinate comprises a byte count value associated with the beginning of the video program.

10. The method of claim 9, wherein the video file comprises MPEG video data and MPEG audio data.

11. An apparatus for retrieving digital video stored in memory comprising:
   (a) a processing module; and
   (b) memory operably coupled to the processing module, wherein the memory includes operational instructions that cause the processing module to: (i) obtain a specific start time of at least a portion of digital video represented as a t-coordinate; (ii) select a minimum n-coordinate and a maximum n-coordinate to bound a specific start location of digital video represented as a n-coordinate; (iii) obtain a minimum t-coordinate based on the minimum n-coordinate;
   (iv) obtain a maximum t-coordinate based on the maximum n-coordinate; (v) derive a linear reference between the minimum n and t coordinates and the maximum n and t coordinates; (vi) obtain a reference n-coordinate lying on the linear reference based on the t-coordinate; (vii) determine a reference t-coordinate lying on a non-linear monotonic function, representing digital video stored over time, based on the reference n-coordinate; (viii) determine whether the reference t-coordinate is substantially similar to the t-coordinate; (ix) when the reference t-coordinate is substantially similar to the t-coordinate, determine that the reference n-coordinate is substantially equal to the n-coordinate, wherein the t-coordinate and the n-coordinate define a starting point of digital video; and (x) retrieve from memory the digital video based on the starting point.

12. The apparatus of claim 11, wherein the memory further comprises operational instructions that cause the processing module to, when the reference t-coordinate is not substantially similar to the t-coordinate,
   (a) determine whether the reference t-coordinate is greater than the t-coordinate;
   (b) when the reference t-coordinate is greater than the t-coordinate, redefine the maximum t-coordinate to equal the reference t-coordinate to produce a first maximum t-coordinate;
   (c) determine a first maximum n-coordinate lying on the non-linear monotonic function based on the first maximum t-coordinate;
   (d) derive a first linear reference between the minimum n and t coordinates and the first maximum n and t coordinates;
   (e) obtain a first reference n-coordinate lying on the first linear reference based on the t-coordinate;
   (f) determine a first reference t-coordinate lying on the non-linear monotonic function based on the first reference n-coordinate;

(g) determine whether the first reference t-coordinate is substantially similar to the t-coordinate; and (h) when the first reference t-coordinate is substantially similar to the t-coordinate, determine that the first reference n-coordinate is substantially equal to the n-coordinate.

13. The apparatus of claim 11, wherein the memory further comprises operational instructions that cause the processing module to, when the reference t-coordinate is not substantially similar to the t-coordinate, (a) determine whether the reference t-coordinate is less than the t-coordinate;

(b) when the reference t-coordinate is less than the t-coordinate, redefine the minimum t-coordinate to equal the reference t-coordinate to produce a first minimum t-coordinate;

(c) determine a first minimum n-coordinate lying on the non-linear monotonic function based on the first minimum t-coordinate;

(d) derive a first linear reference between the first minimum n and t coordinates and the maximum n and t coordinates;

(e) obtain a first reference n-coordinate lying on the first linear reference based on the t-coordinate;

(f) determine a first reference t-coordinate lying on the non-linear monotonic function based on the first reference n-coordinate;

(g) determine whether the first reference t-coordinate is substantially similar to the t-coordinate; and (h) when the first reference t-coordinate is substantially similar to the t-coordinate, determine that the first reference n-coordinate is substantially equal to the n-coordinate.

14. The apparatus of claim 11, wherein the t-coordinate comprises a time stamp value associated with a beginning of a video program stored in a video file and wherein the n-coordinate comprises a byte count value associated with the beginning of the video program.

15. The apparatus of claim 14, wherein the video file comprises MPEG video data and MPEG audio data.

16. An apparatus for retrieving digital video stored in memory comprising:

(a) a processing module; and (b) memory operably coupled to the processing module, wherein the memory includes operational instructions that cause the processing module to: (i) obtain a specific start time of digital video represented as a t-coordinate; (ii) select a minimum point and a maximum point that bound the starting point, wherein the minimum point and the maximum point lie on a non-linear monotonic function representing digital video stored over time; (iii) derive a linear reference between the minimum and the maximum points; (iv) obtain a reference n-coordinate lying on the linear reference based on the t-coordinate; (v) determine a reference t-coordinate lying on the non-linear monotonic function based on the reference n-coordinate; (vi) determine whether the reference t-coordinate is substantially similar to the t-coordinate; (vii) when the reference t-coordinate is not substantially similar to the t-coordinate, redefine the minimum point or the maximum point based on the reference t-coordinate; (viii) repeat steps (ii) through (vii) until the reference t-coordinate is substantially similar to the t-coordinate; (ix) when the reference t-coordinate is substantially similar to the t-coordinate, determine that the reference n-coordinate is substantially equal to a specific start location of digital video represented at the n-coordinate, wherein the t-coordinate and the n-coordinate define the staring point; and (x) retrieve from memory the digital video based on the starting point.

17. The apparatus of claim 16, wherein the memory further comprises operational instructions that cause the processing module to, when the reference t-coordinate is not substantially similar to the t-coordinate, (a) redefine the minimum point to correspond to the reference t-coordinate and the reference n-coordinate, when the reference t-coordinate is less than the t-coordinate.

18. The apparatus of claim 16, wherein the memory further comprises operational instructions that cause the processing module to, when the reference t-coordinate is not substantially similar to the t-coordinate, (a) redefine the maximum point to correspond to the reference t-coordinate and the reference n-coordinate, when the reference t-coordinate is greater than the t-coordinate.

19. The apparatus of claim 16, wherein the t-coordinate comprises a time stamp value associated with a beginning of a video program stored in a video file and wherein the n-coordinate comprises a byte count value associated with the beginning of the video program.

20. The apparatus of claim 19, wherein the video file MPEG video data and MPEG audio data.

* * * * *